United States Patent
Ippers et al.

(10) Patent No.: US 8,783,324 B2
(45) Date of Patent: Jul. 22, 2014

(54) DEVICE FOR PROCESSING A PACKING MATERIAL USING ULTRASOUND

(75) Inventors: Juergen Ippers, Grefrath (DE); Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 13/262,857

(22) PCT Filed: Feb. 26, 2010

(86) PCT No.: PCT/EP2010/052484
§ 371 (c)(1),
(2), (4) Date: Dec. 19, 2011

(87) PCT Pub. No.: WO2010/115660
PCT Pub. Date: Oct. 14, 2010

(65) Prior Publication Data
US 2012/0073762 A1    Mar. 29, 2012

(30) Foreign Application Priority Data

Apr. 9, 2009 (DE) .......................... 10 2009 002 295

(51) Int. Cl.
B32B 37/00 (2006.01)
B29C 65/08 (2006.01)
B29C 65/00 (2006.01)

(52) U.S. Cl.
CPC ............ B29C 65/087 (2013.01); B29C 66/8163 (2013.01); B29C 66/83411 (2013.01)
USPC ..................................... 156/580.2; 156/580.1

(58) Field of Classification Search
CPC .... B29C 65/08; B29C 65/085; B29C 65/086; B29C 65/087; B29C 66/8163; B29C 66/83411

USPC .......... 156/73.1, 555, 580, 580.1, 580.2, 582, 156/583.1
See application file for complete search history.

(56) References Cited

U.S. PATENT DOCUMENTS

| | | | |
|---|---|---|---|
| 4,387,000 A * | 6/1983 | Tancredi | 156/495 |
| 4,517,790 A | 5/1985 | Kreager | |
| 4,619,728 A * | 10/1986 | Brink | 156/555 |
| 5,133,828 A * | 7/1992 | Jacques | 156/555 |
| RE37,345 E * | 9/2001 | Bradshaw et al. | 156/495 |
| 6,287,403 B1 | 9/2001 | Couillard et al. | |
| 7,690,548 B2 * | 4/2010 | Mlinar et al. | 228/1.1 |
| 2004/0011452 A1 | 1/2004 | Capodieci | |
| 2006/0144904 A1 | 7/2006 | Mlinar et al. | |

FOREIGN PATENT DOCUMENTS

| | | |
|---|---|---|
| CN | 1179128 A | 4/1998 |
| CN | 101094761 A | 12/2007 |
| EP | 0 356 889 A2 | 3/1990 |
| FR | 2 732 264 | 10/1996 |

OTHER PUBLICATIONS

International Search Report corresponding to PCT Application No. PCT/EP2010/052484, mailed Jun. 10, 2010 (German and English language document) (5 pages).

* cited by examiner

*Primary Examiner* — James Sells
(74) *Attorney, Agent, or Firm* — Maginot, Moore & Beck

(57) ABSTRACT

A device includes at least one bearing shield, at least one sonotrode which is rotatably mounted in the bearing shield, at least one anvil which interacts with the sonotrode to process the packing material, at least one other bearing shield to rotatably mount the anvil, whereupon a coupling mechanism is arranged to mechanically couple both bearing shields. The coupling mechanism is configured so that a relative motion between both bearing shields is made possible.

20 Claims, 5 Drawing Sheets

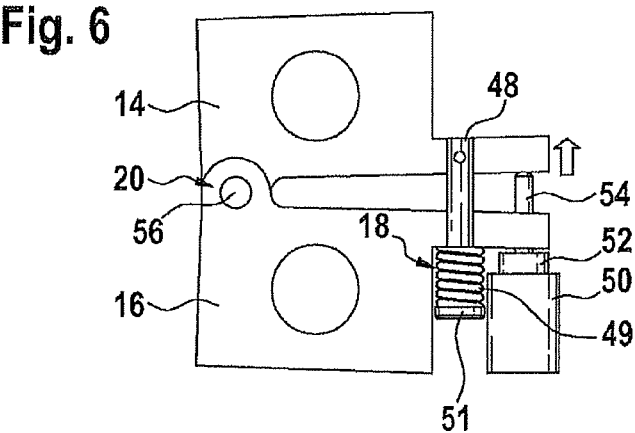
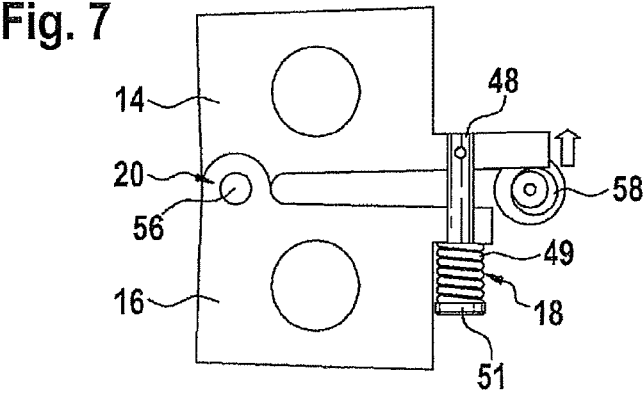
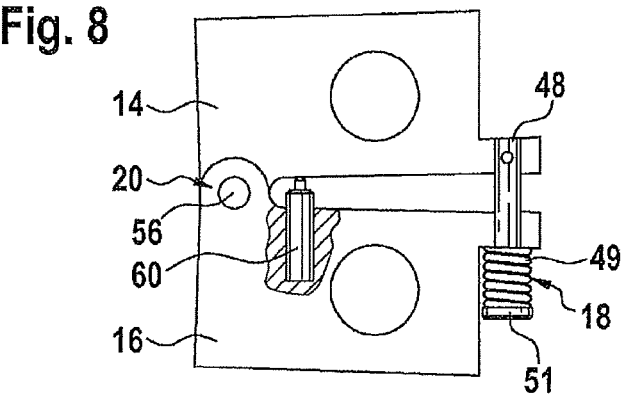

DEVICE FOR PROCESSING A PACKING MATERIAL USING ULTRASOUND

This application is a 35 U.S.C. §371 National Stage Application of PCT/EP2010/052484, filed Feb. 26, 2010, which claims the benefit of priority to Application Serial No. DE 10 2009 002 295.3, filed Apr. 9, 2009 in Germany, the disclosures of which are incorporated herein by reference in their entirety.

BACKGROUND

The feature of the disclosure are based on a device for processing a packing material by means of ultrasound according to the preamble of the independent claim. A generic device of said type is known for example from US 2004/0011452 A1. Said document describes an ultrasound-based transverse sealing device for bar packs, which transverse sealing device is composed of a rotating sonotrode and a rotating anvil. Said document however does not specify in any greater detail how the sonotrode and anvil are supposed to be mechanically arranged relative to one another.

The disclosure is based on the object of specifying a compact and robust device. Said object is achieved by means of the features set forth below.

SUMMARY

In contrast to this, the device according to the disclosure for processing a packing material by means of ultrasound has the advantage of permitting a single-piece, compact design of the ultrasound sealing station. In this way, it is made possible for conventional hot sealing devices to be replaced with the device according to the disclosure. Since at least one coupling means is provided between a bearing shield of the sonotrode and a bearing shield of the anvil, all the necessary setting parameters for the joining process of the material web can be precisely adjusted. Furthermore, the sealing force required for the ultrasound sealing can be easily imparted and set by means of the device thus formed. The coupling means may, with suitable design, serve to accommodate the forces during the sealing and cutting of the packing material in an overload situation. Specifically, the coupling means, in particular if designed as a bending beam, is capable of enlarging the sealing gap between the sonotrode and anvil if, in the event of a fault, a product or foreign body passes into the sealing point.

In an expedient refinement, it is provided that a bending beam is used as a coupling means. Said bending beam permits coupling which however allows a certain relative movement of the sonotrode and anvil. In contrast to a conventional bearing, the bending beam permits play-free, smooth-running coupling of the two bearing shields for anvil and sonotrode respectively. The lack of play of the coupling means has a positive effect for precise setting of the sealing gap. Furthermore, the bending beam does not become contaminated so easily, in contrast to a conventional bearing. Furthermore, the thermal expansion of the bending beam under normal ambient conditions is very small and thus barely influences the gap regulation. Furthermore, the bending beam is cheap to produce and exchange.

In an expedient refinement, it is provided that the bending beam should be attached between the sonotrode and anvil at a point spaced apart as far as possible from the sealing point. It is then possible, if necessary, to dispense with a readjustment of the roller positions of anvil and sonotrode during the setting of the sealing gap. In an expedient refinement, it is provided that the fastening elements for fastening the bending beam to the respective bearing shields are mounted on the respective outer ends of the bending beam. This reduces the probability of readjustments.

In an expedient refinement, it is provided that the bending beam may have a certain preload. Said preload increases the sealing force.

Further expedient refinements will emerge from the further dependent claims and from the description.

BRIEF DESCRIPTION OF THE DRAWINGS

Exemplary embodiments of a device for processing a packing material by means of ultrasound are illustrated in the drawing and will be described in more detail below.

In the drawing:

FIG. 6 shows a side view of a first adjusting device, FIG. 7 shows the side view of a second adjusting device, and FIG. 8 shows the side view of a third adjusting device.

DETAILED DESCRIPTION

Figure 1:
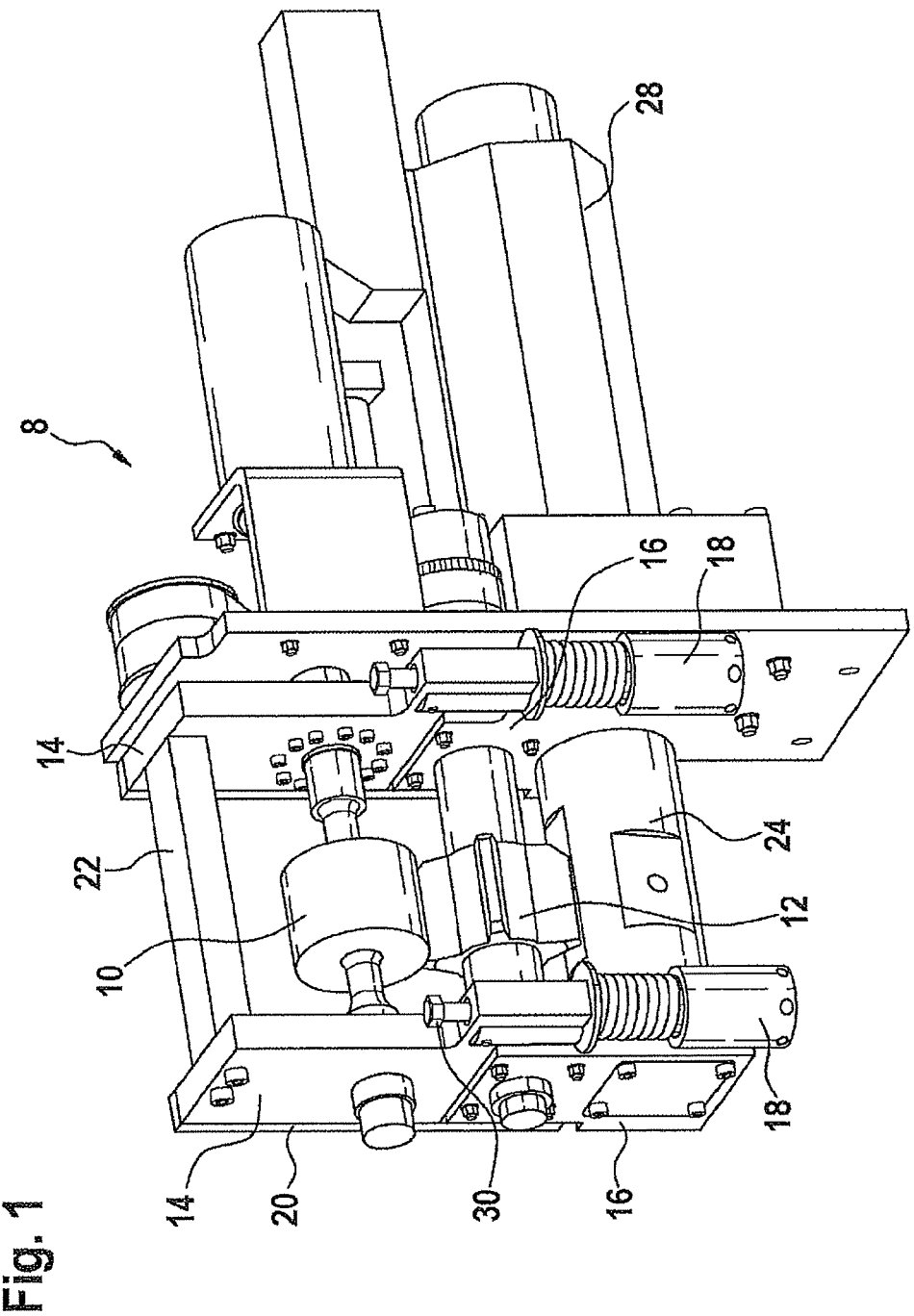
FIG. 1 shows a perspective front view of the device for processing a packing material.

In the device according to FIG. 1, a sonotrode 10 is rotatably mounted on both sides by in each case one bearing shield 14. The two bearing shields 14 for the sonotrode 10 are laterally connected to one another at the top side of the device 8 by an upper support means 22, designed here by way of example as a support beam. A likewise rotatably mounted anvil 12 interacts with the sonotrode 10. The anvil 12 is mounted in two bearing shields 16. The bearing shield 14 of the sonotrode 10 is connected by a coupling means 20 to the bearing shield 16, situated therebelow in each case, of the anvil 12. The two bearing shields 16 of the anvil 12 are in turn laterally connected to one another by a lower support means 24, which is formed by way of example as a support tube. Arranged in each case on the opposite side of the coupling means 20 in relation to the axes of rotation of the sonotrode 10 and anvil 12 are force means 18 by means of which the required sealing force can be applied to the sealing surface of the sonotrode 10 and anvil 12. Setting means 30 are provided in each case above the force means 18. In this way, the sealing force or sealing gap can be adjusted.

Figure 2:
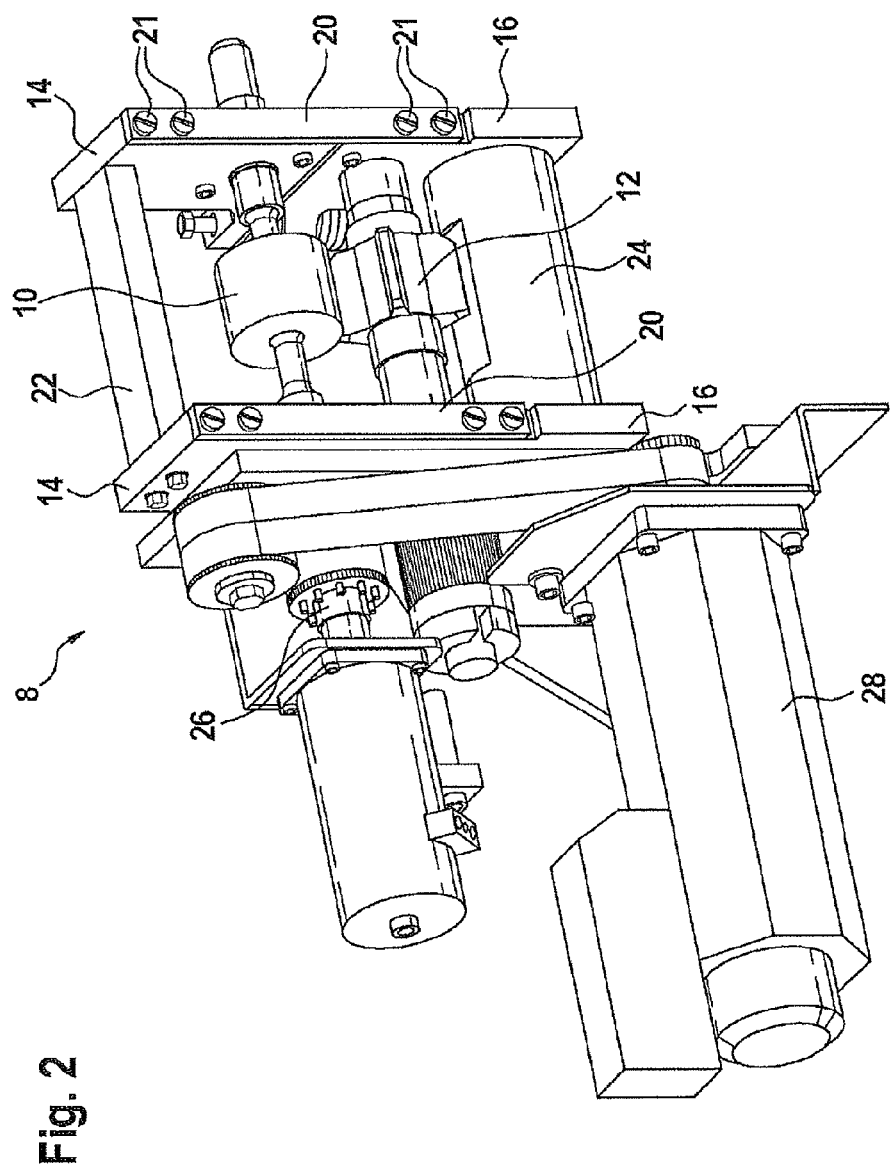
FIG. 2 shows the rear view of the device according to FIG. 1.

In the rear view, shown in FIG. 2, of the device 8 described in FIG. 1, it is clear that the bearing shield 14 of the sonotrode 10 is connected in each case to the bearing shield 16, arranged therebelow, of the anvil 12 by the coupling means 20, which is designed by way of example as a bending beam here. The coupling means 20 is connected at the top end to the end side of the bearing shield 14 by means of two fastening elements 21, and is connected at the bottom end to the bearing shield 16 by means of two fastening elements 21. Here, a gap is provided between the bottom edge of the bearing shield 14 of the sonotrode 10 and the top edge of the bearing shield 16 of the anvil 12, which gap is bridged only by the coupling means 20. Furthermore, a drive 28 is provided which, by means of a drive element 26, drives both the sonotrode 10 and also the anvil 12 in opposite directions.

Figure 3:
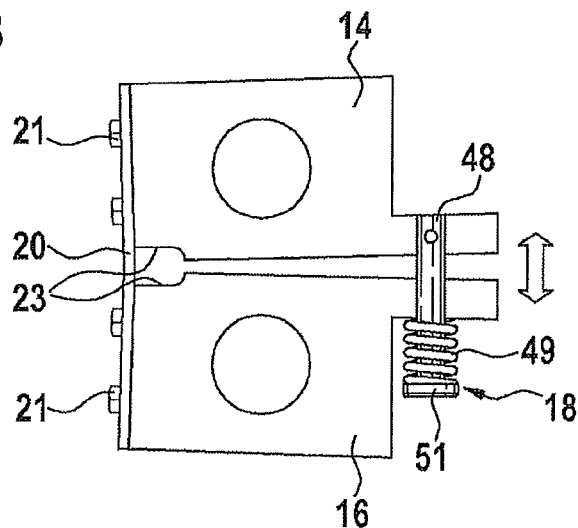
FIG. 3 shows a side view of a coupling means.

In the view of FIG. 3, the bearing receptacles for the rotating sonotrode 10 and the rotating anvil 12 are visible as round openings. The bearing shield 14 of the sonotrode 10 is connected to the bearing shield 16 of the anvil 12 at one side by the coupling means 20, which is designed as a bending beam. On the opposite side, the force means 18 loads the bearing shields 14, 16 with a force toward one another via the coupling means 20, which acts as a joint. In the direction of the coupling means 20, the bearing shields 14, 16 each have recesses 23. The desired bending capability of the bending beam 20 can thus be influenced by the bending length formed in this way. In the arrangement shown, the bending beam acts as a center of rotation, by means of which the spacing between the sonotrode 10 and anvil 12 can be varied. The design of the coupling means 20 as a bending beam offers a relatively rigid but nevertheless articulated connection between the two bearing shields 14, 16. The use of a bending beam as a coupling means 20 also acts as an overload protection means in the event of a crash. The bending beam 20 thus permits a defined opening and bending of the sealing gap between the sonotrode 14 and anvil 16 even in the event, for example, of a product or foreign body becoming jammed between the sonotrode 10 and anvil 12. Damage to the sonotrode 10 and anvil 12 is thereby prevented because the bending beam 20 permits an enlargement of the sealing gap. The bending beam is composed preferably of a metallic material.

The sealing gap between the sonotrode 10 and anvil 12 can be varied according to setting. The force means 18 has the effect of moving the upper and lower bearing shields 14, 16 toward one another about the center of rotation 56, and thereby imparting a force to the sealing surfaces. For this purpose, a plunger 48 is connected at one side to the bearing shield 14 of the sonotrode 10 such that a movement of the plunger 48 also causes a movement of the bearing shield 14. The plunger 48 is guided through an opening in the bearing shield 16 of the anvil 14, so as to be movable relative to the bearing shield 16, ends with a flange 51. The flange 51 serves as a support surface for a spring 49 which, at the other side, is supported against the underside of the bearing shield 16 of the anvil 12. The spring 49 is designed as a spiral spring and surrounds the plunger 48. The force means 18 is preferably designed to be adjustable. For this purpose, it would for example be possible for the setting means 30 in the form of a screw to vary the preload of the spring 49 and thereby ultimately the sealing force.

Figure 4:
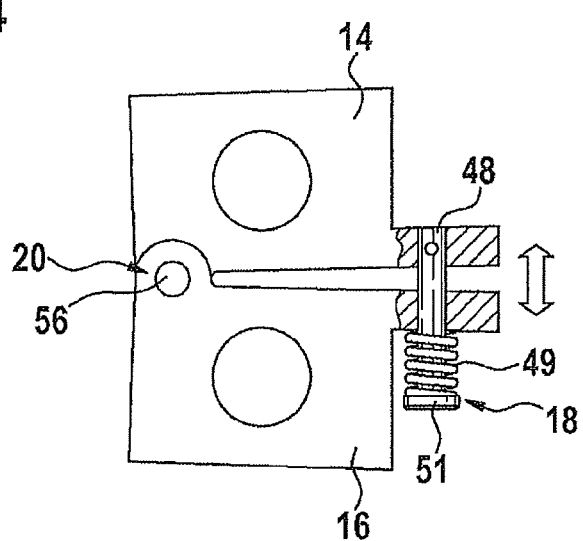
FIG. 4 shows a side view of a further alternative coupling means.

In the exemplary embodiment of FIG. 4, as a coupling means 20, a bush-pin connection is provided which permits a rotational movement of the two bearing shields 14, 16 relative to one another about a center of rotation 56. It is however essential that the coupling means 20 permits a relative movement between the bearing shield 14 of the sonotrode 10 and the bearing shield 16 of the anvil 12 in such a way that the sonotrode 10 and anvil 16 can be moved relative to one another in order to realize the setting of a sealing gap depending on the packing material. The axis of rotation about the center of rotation 56 is parallel to the axis of rotation of the sonotrode 10 and anvil 12.

Figure 5:
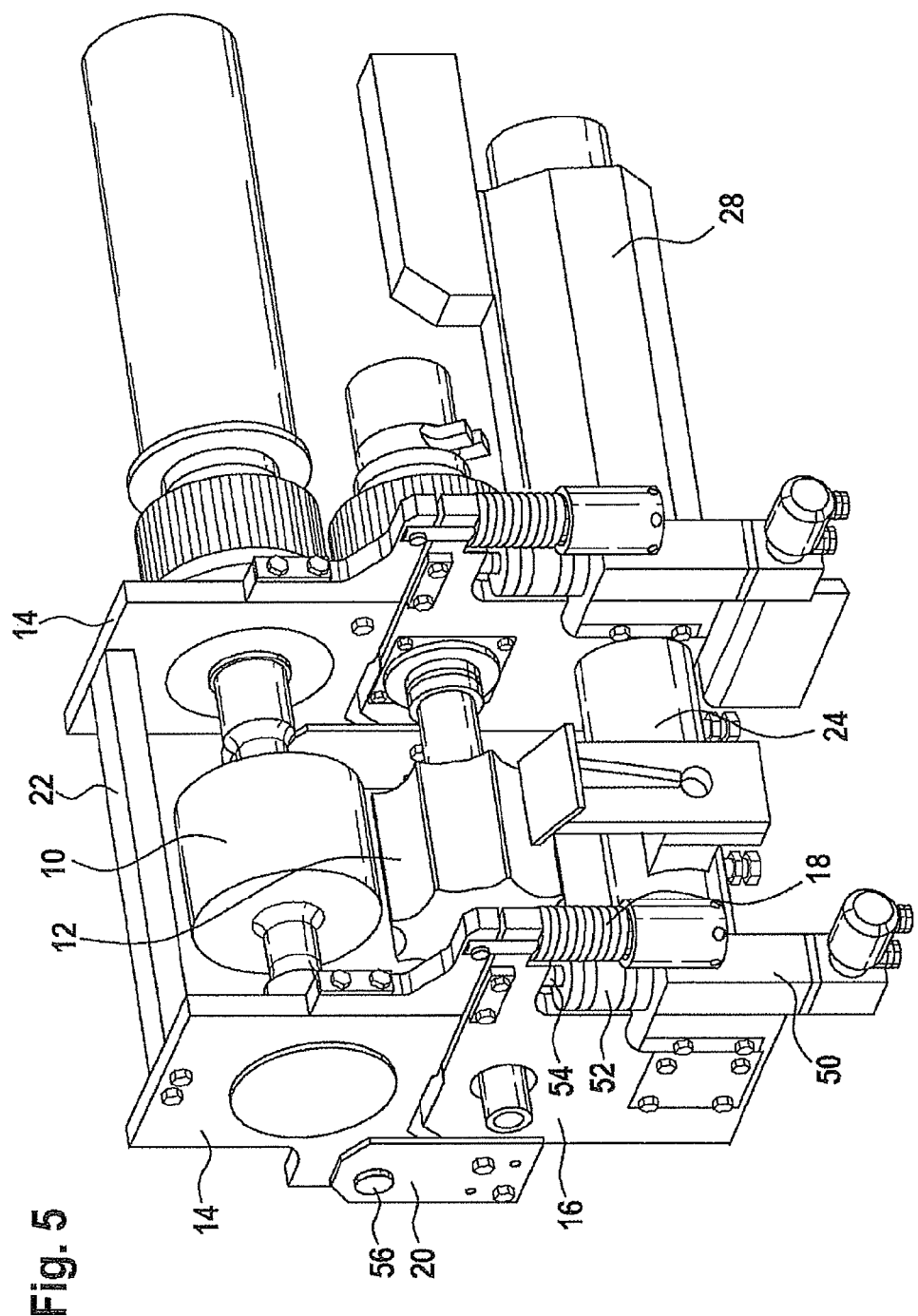
FIG. 5 shows a perspective illustration of a further exemplary embodiment of the device for processing a packing material, expanded to include an adjusting means.

The exemplary embodiment of FIG. 5 differs from that of FIGS. 1 and 2 substantially in that adjusting means 50 are additionally provided. The adjusting means 50 comprise a coupling 52 and a threaded bolt 54 for gap adjustment by adjusting the bearing shield 14 of the sonotrode 10 relative to the bearing shield 16 of the anvil 12. Furthermore, in the exemplary embodiment of FIG. 5, the coupling means 20 is in a lateral arrangement. Here, a bolt is coupled to the bearing shield 14 of the sonotrode 10, and a bush which engages correspondingly into the bolt is coupled to the bearing shield 16 of the anvil 12 at the center of rotation 56.

The exemplary embodiments of FIGS. 6 to 8 show different variants of the adjustment possibilities between the bearing shield 14 of the sonotrode 10 and the bearing shield 16 of the anvil 12. FIG. 6 corresponds to the variant illustrated in FIG. 5, where the adjusting means 50 presses via the coupling 52 and the threaded bolt 54 against the lower edge of the bearing shield 14 of the sonotrode 10 and thereby effects a relative movement about the center of rotation 56. The adjusting means 50 is arranged at as great a distance from the center of rotation 56 as possible. As an adjusting device 50, a servo motor is for example provided which, via the threaded bolt 54, imparts a translatory movement to the bearing shield 14. Here, the lower bearing shield 16 will function, in effect, as a base, and push the upper bearing shield 14 upward via the threaded bolt 54 as the latter is unscrewed. The force means 18 furthermore ensure that the upper bearing shield 14 always bears against the threaded bolt 54 and thus also moves downward as the threaded bolt 54 is screwed in. On account of the pressure acting continuously from above, the thread play does not have a noticeable adverse effect. The use of in each case one servo motor with threaded bolt 54 in the left-hand and right-hand bearing shields 14, 16 makes it possible for the sonotrode 10 and the anvil 12 to be automatically aligned parallel to one another. In the exemplary embodiment of FIG. 6, very small and also relatively large adjustment travels can be attained very accurately.

In the exemplary embodiment of FIG. 7, the spacing can be varied by means of an eccentric 58 which is rotatably mounted parallel to the axis of rotation of the sonotrode 10 and anvil 12. The force means 18 again effects a preload between the two bearing shields 14, 16. The rotational movement of a servo motor is converted by means of the eccentric disk 58 into a translatory movement. Whereas the eccentric disk 58 is fixedly mounted, the upper bearing shield 14 are raised and lowered by means of the eccentric disks 58.

In the exemplary embodiment of FIG. 8, an actuator 60 is provided which engages relatively close to the center of rotation 56. The actuator is for example a piezoelectric actuator 60 which converts electrical energy into a mechanical change in travel. Piezoelectric actuators 60 are advantageous because they can carry out movements in the sub-nanometer range. Furthermore, piezoelectric actuators 60 are maintenance-free and wear-free. In static operation, they require no power. Furthermore, high loads can be moved.

The device 8 for processing a packing material by means of ultrasound operates as follows. It comprises, as an essential element, the sonotrode 10 which, as an active welding tool, acts against the anvil 12. The mains voltage is converted by an electric generator into a high-frequency electric voltage. A sound converter (converter) is connected to the generator and in turn converts the electrical energy into high-frequency mechanical vibrations. By means of an amplitude transformation piece (booster), the amplitudes are amplified or reduced and are transmitted from the converter to the sonotrode 10. The anvil 12 is the passive workpiece. The workpiece to be welded, for example the packing material, is clamped between the anvil 12 and the sonotrode 10, in order thereby to permit the transmission of energy between sonotrode 10 and the packing material. The anvil 12 absorbs the ultrasound vibrations of the sonotrode 10. Both the sonotrode 10 and also the anvil 12 rotate in opposite directions and are designed, in effect, as sealing rolls. They have a plurality of sealing surfaces into which may also be integrated a cutting function for cutting the packing material. Depending on the type of packing material, a sealing gap must be set with high accuracy. A sealing gap denotes the spacing of the sealing surface of the sonotrode 10 from the sealing surface of the anvil 12. Said sealing gap is adjusted to the desired size by adjusting means, illustrated by way of example in FIGS. 5 to 8, such as an adjusting drive 50, eccentric 58 or actuator 60. Said adjusting means act on at least one bearing shield 14 relative to the other bearing shield 16. If the size of the sealing gap varies during ongoing operation, the adjusting means 50 can adjust said gap back to the desired setpoint size. The force means 18, designed for example as a spring, on the end of the bearing shields 14, 16 serves to press the bearing shields 14, 16 together and impart the required sealing and/or cutting force. Furthermore, by means of the toothed belt drive, forces act on the sonotrode 10 which seek to raise the upper bearing shields 14, which is prevented by the force means 18. The force means 18 could also be of pneumatic or hydraulic design instead of a spring. The coupling means 20 serve to movably connect the bearing shield 14 of the sonotrode 10 to the bearing shield 16 of the anvil. In addition to the described variants, linear guides such as for example column guides could also be provided, which permit a relative linear movement of the bearing shields 14, 16 with respect to one another.

The bearing shields 14 form side cheeks which are connected to one another by the support means, specifically the support beam 22. The support tube 24 could also serve for stabilization and as a holding facility in the packaging machine. The drive coupling of the upper and lower sealing rolls (sonotrode 10 and anvil 12) is realized by means of toothed belts. The rotational speed of the sealing rolls is dependent on the speed of the strip of the packing tube to be sealed and may for example be event-controlled. Said dynamics are attained by means of the drive 28, for example a servo motor, which transmits the forces and torques by means of a drive element 26 designed as a toothed belt. The described device allows the parameters required for the joining process by means of ultrasound, such as for example the sealing gap, sealing force and sealing time, to be set very precisely and in a manner appropriate to the application. The setting of the sealing force can be realized via the force means 18. The force means are designed for example as springs, such that it is possible for the sealing force to be set linearly with respect to the spring characteristic curve. The force means 18 act on the two bearing shields 14, 16, such that the sealing force between the upper sealing roll, the sonotrode 10, and the lower sealing roll, the anvil 12, can be set.

The described device 8 is suitable in particular for the formation of a transverse sealing seam for tubular bags. Tubular bag machines of said type may be arranged horizontally or vertically depending on the product to be packed.

The invention claimed is:

1. A device for processing a packing material by use of ultrasound, comprising:
   at least one bearing shield;
   at least one sonotrode which is rotatably mounted in the at least one bearing shield and defines a longitudinal axis about which the at least one sonotrode rotates;
   at least one anvil which interacts with the sonotrode in order to process the packing material;
   at least one further bearing shield for rotatably mounting the anvil; and
   at least one coupler configured to mechanically couple the at least one bearing shield and the at least one further bearing shield,
   wherein the coupler is designed so as to permit a relative movement between the at least one bearing shield and the at least one further bearing shield, and
   wherein the coupler is connected to the at least one bearing shield and the at least one further bearing shield in such a way the at least one bearing shield and the at least one further bearing shield are rotatable relative to one another about an axis that is generally parallel to the longitudinal axis of the at least one sonotrode.

2. A device for processing a packing material by use of ultrasound, comprising:
   at least one bearing shield;
   at least one sonotrode which is rotatably mounted in the at least one bearing shield;
   at least one anvil which interacts with the sonotrode in order to process the packing material;
   at least one further bearing shield for rotatably mounting the anvil; and
   at least one coupler configured to mechanically couple the at least one bearing shield and the at least one further bearing shield,
   wherein the coupler is designed so as to permit a relative movement between the at least one bearing shield and the at least one further bearing shield, and
   wherein the coupler includes at least one bending beam.

3. The device as claimed in claim 1, wherein the coupler includes at least one joint or a bush-pin connection.

4. The device as claimed in claim 1, wherein at least one recess is provided in one of the at least one bearing shield and the at least one further bearing shield for influencing the bending characteristics of the coupler.

5. The device as claimed in claim 1, further comprising an adjusting mechanism configured to set a defined gap between the sonotrode and the anvil.

6. The device as claimed in claim 5, wherein the adjusting mechanism includes one of a servo drive, a piezoelectric actuator, and an eccentric disk.

7. The device as claimed in claim 1, further comprising at least one force mechanism configured to impart an opposing force between the at least one bearing shield and the at least one further bearing shield.

8. The device as claimed in claim 7, wherein the at least one force mechanism includes at least one setting mechanism configured to adjust the opposing force.

9. The device as claimed in claim 8, wherein the at least one force mechanism has at least one spring which is arranged such that the at least one bearing shield and the at least one further bearing shield are preloaded against one another.

10. The device as claimed in claim 9, wherein the force mechanism comprises at least one plunger which is connected both to the at least one bearing shield and also to the at least one spring.

11. The device as claimed in claim 1, wherein additional bearing shields are provided for two-sided mounting of the sonotrode and/or the anvil.

12. The device as claimed in claim 2, wherein the coupler includes at least one joint or a bush-pin connection.

13. The device as claimed in claim 2, wherein at least one recess is provided in one of the at least one bearing shield and the at least one further bearing shield for influencing the bending characteristics of the coupler.

14. The device as claimed in claim 2, further comprising an adjusting mechanism configured to set a defined gap between the sonotrode and anvil.

15. The device as claimed in claim 14, wherein the adjusting mechanism includes one of a servo drive, a piezoelectric actuator, and an eccentric disk.

16. The device as claimed in claim 2, further comprising at least one force mechanism configured to impart an opposing force between the at least one bearing shield and the at least one further bearing shield.

17. The device as claimed in claim 16, wherein the at least one force mechanism includes at least one setting mechanism configured to adjust the opposing force.

18. The device as claimed in claim 17, wherein the at least one force mechanism has at least one spring which is arranged such that the at least one bearing shield and the at least one further bearing shield are preloaded against one another.

19. The device as claimed in claim 18, wherein the force mechanism comprises at least one plunger which is connected both to the at least one bearing shield and also to the at least one spring.

20. The device as claimed in claim 2, wherein additional bearing shields are provided for two-sided mounting of the sonotrode and/or the anvil.

\* \* \* \* \*